July 5, 1938. E. D. KATTERMANN Re. 20,785

GARMENT

Original Filed Nov. 10, 1933

INVENTOR
EMIL D. KATTERMANN

BY H. C. Wiseman
ATTORNEY

Reissued July 5, 1938

Re. 20,785

UNITED STATES PATENT OFFICE 20,785

GARMENT

Emil D. Kattermann, Dover, N. J., assignor to Swiss Knitting Company, Dover, N. J., a corporation of New Jersey Original No. 2,045,391, dated June 23, 1936, Serial No. 697,424, November 10, 1933. Application for reissue May 19, 1938, Serial No. 208,855

6 Claims. (Cl. 66—176)

This invention relates to garments of the type intended to confine, support and mold the figure and to a method of producing such garments. More particularly it relates to garments of this character having at least a portion thereof formed of elastic material capable of stretching in at least one direction and, if desired, simultaneously in all directions, that is to say both longitudinally and transversely of the garment. Such material may conveniently be referred to as one-way or two-way stretch or one-way or two-way elastic material.

An important feature of the invention is the formation of a part of the elastic material of the garment in such a way that stays for giving rigidity and support to portions of the garment may be incorporated without adding materially to the thickness or bulk of the garment at the points where the stays are inserted. This is accomplished by forming a longitudinally extending welt in the fabric at each point where a stay is to be used. The formation of such a welt will provide a pocket of any desired width and length into which the stay may be placed in the course of producing the fabric. This not only provides an unusually neat effect but the usual bulkiness and attendant discomfort resulting from the formation of stay pockets by the addition of tapes and the like to one face of the finished fabric is avoided. Even more important is the production of a stay pocket in this way which will not interfere with the stretch of the elastic material.

If the pocket were formed in the way ordinarily employed in connection with non-elastic fabrics, by the stitching of a separate tape to one face of the fabric, there would be interference with the longitudinal stretch of the material. Even if the tape or strip used for this purpose were itself capable of stretching longitudinally, the difficulty would not be completely solved since the stitching would still interfere with the stretch. Furthermore, the stitching would have a tendency to tear the fabric or permanently distort some of the threads.

The invention may be practiced in connection with a garment employing either a woven or a knit elastic fabric. It may be used to particular advantage, however, in a knit construction and it has accordingly been specifically illustrated in connection with a garment of this type.

Various objects and advantages of the invention, in addition to those above pointed out, will become apparent from the detailed description of an illustrative form of the invention which will now be given in conjunction with the accompanying drawing in which.

Figure 1:
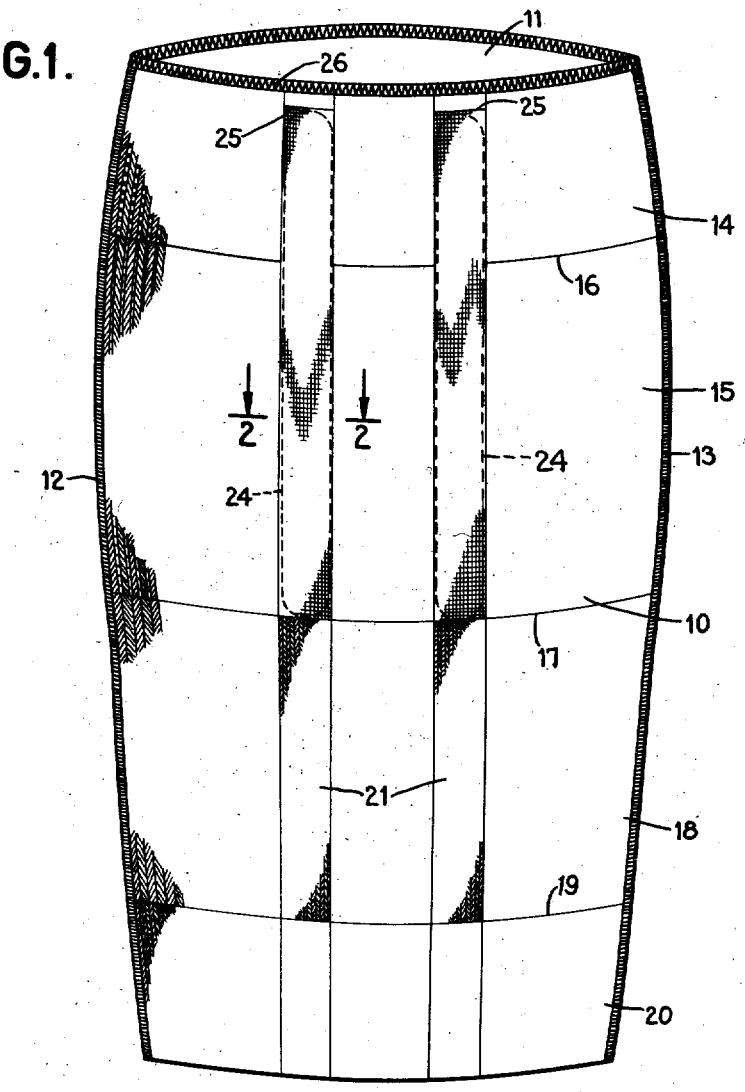
Figure 1 is a perspective view from the front of a garment embodying the features of the present invention.

Referring now to the drawing, there is illustrated a girdle adapted to extend from a point at or above the waistline to a point well below the buttocks. It comprises a front section 10 and a rear section 11 joined at the two sides by longitudinal seams 12 and 13, thus forming a continuous body-encircling member. The front section may conveniently be formed with a number of different styles of knitting. For example, the top portion 14 of this section may be produced with one style of stitch adapted to allow a somewhat easier and greater stretch than a section 15 below a dividing line 16. The portion 15 may conveniently be formed with a type of stitch adapted to exert a relatively firm transverse tension so as to produce a firm confining action over the abdomen of the wearer. If desired, the portion 15 may be continued with the same type of stitch to a point near the bottom of the garment. It is preferred, however, to modify the stitch somewhat at a point about half way down, as indicated by the line 17 in Figure 1. This, then, provides for a still different type of stitch in a portion 18 of the garment substantially in line with the hips. The difference between the portions 15 and 18 may, for example, comprise the inclusion of laid-in elastic threads in the portion 15 extending across the garment and the omission of these laid-in threads in the portion 18. Other schemes might be substituted for this to produce the desired effect. The bottom of the garment below the line 19 may be formed by a still different type of stitch. This bottom portion 20 is preferably of such construction that it will stretch relatively easily so as not to create any uncomfortable and undue confinement at the bottom of the garment which surrounds the thighs. The stitch employed in this portion may conveniently be substantially the same as that employed in the portion 14 without, however, including transversely extending laid-in elastic threads, preferably provided in the section 14.

The front section 10 of the garment is preferably also divided into different types of knitting in different longitudinal zones. For example, the longitudinally extending areas 21 indicated in Figure 1 may be formed with a somewhat different type of stitch from the areas to either side of and between the zones 21. For example, the knitting in the areas 21 may be somewhat closer than in the other areas. In the knitting of the fabric forming the front section 10, there should be employed a knitting machine provided with separate cam controls for different groups of needles. For example, the groups of needles 22 adapted to form the areas to each side of and between the areas 21 may be somewhat longer than the needles 23 adapted to produce the areas 21 and different cams may be provided for controlling the needles 22 and 23, respectively. Furthermore, the machine should be provided with suitable controls, well known in the knitting art, for varying the style or nature of the stitch in all or a part of the zones as the knitting of the fabric progresses.

Now, as the line 17 is reached in the course of knitting the fabric from the lower end as shown, the groups of needles 23, which have been knitting the longitudinal areas 21, may be so controlled that upon movement of the thread carriage in one direction across the machine, only those needles on one side of the line of the fabric will be operated to form loops while on the return movement of the thread carriage, the needles 23 on the opposite side of the line of the fabric will be operated to form loops. On the other hand, the needles 22 may be so controlled that they will continue at this time to operate on both sides of the line of the fabric during movement of the thread carriage in both directions. This will result in the formation of a single, thick fabric by means of the needles 22 and a divided or double fabric of two thin layers by means of the needles 23.

Figure 3:
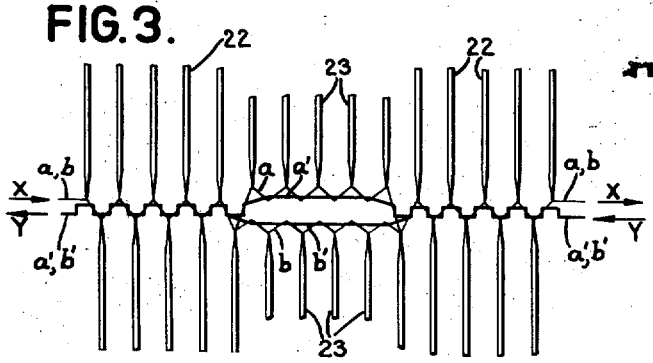
Figure 3 is a diagrammatic view illustrating the manner in which the stay-receiving pockets are produced.
Figure 2:
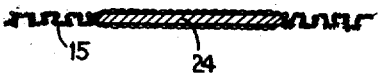
Figure 2 is a sectional view on an enlarged scale along the line 2—2 of Figure 1, showing a detail of the construction.

The operation is illustrated diagrammatically in Figure 3 in which *a* indicates the course of thread laid down in the movement of the carriage toward the right, *b* indicates the thread laid down upon the return movement of the carriage toward the left while *a'* and *b'* indicate corresponding threads laid down during the preceding reciprocation of the carriage. Thus, as the thread carriage moves toward the right, as indicated by the arrows X, the thread *a* will be engaged by all of the needles 22 to form loops on both sides of the fabric, interengaged with the loops previously formed by the course of thread *b'*. However, as the area produced by the needles 23 is reached, only those needles on one side of the fabric will produce loops interengaged with the loops previously formed by the course of thread *a'*, and hence a relatively thin fabric will be produced over this area. Upon then reaching the zone of action of the next group of needles 22, the loops will be formed on both sides of the fabric by interengagement with the preceding course *b'*, and so on across the material. Upon the return movement of the thread carriage in the direction of the arrow Y, the needles 22 will again operate to form loops on both sides of the fabric from the course of thread *b* interengaged with the loops previously formed by the thread *a* while when the zone of the needles 23 is reached only those on the opposite face of the fabric from those originally operating will work to produce a second thin section of fabric across the area 21. This will be done by interengagement of the new course of thread *b* with the course *b'* laid down on the preceding return movement of the thread carriage. As the knitting progresses it will be apparent that a longitudinally extending welt is formed of any desired width, depending upon the number and spacing of the needles 23 in each group.

Any number of welts may be produced, two being illustrated in the drawing. These welts provide longitudinally extending pockets which are integral with the material and adapted to receive stays 24 or other stiffening elements, or the like. These stays may be conveniently inserted after the full length of the pockets has been completed, for example up to the line 25 in Figure 1. After the stays have been inserted, the needles 23 on the opposite sides of the fabric may again be controlled in such a way that these needles will operate to form loops on both sides of the fabric during the passage of the thread carriage in both directions. In this way the upper ends of the pockets formed by the welts will be closed and the garment may be extended beyond the stays for any desired distance. Preferably only a small section of the garment will be left above the ends of the stays, if the garment is of the girdle type, inasmuch as the primary purpose of the stays is to lend support and stiffness to the top portion of the garment and to the region overlying the abdomen. Obviously, the welts or pockets might be formed at any other point in the material and the stays inserted wherever it is desired to lend support and stiffness to the garment. If a combination garment including a brassière portion is produced the stays will ordinarily be arranged some distance down from the upper edge of the garment.

The back section 11 of the garment may be formed in substantially the same way as the front section, if desired, or an entirely different sort of fabric may be employed. Preferably it will at least have top and bottom portions, corresponding to the portions 14 and 20 of the front section, of a somewhat different style of knit from the intermediate portion.

In the knitting of the sections 10 and 11, they may, if desired, be formed as individual lengths of fabric removed from the machine upon the completion of each section. On the other hand, if desired the knitting may be conducted more or less continuously so that a series of sections will be produced in one continuous knitting operation and these sections then cut apart upon the completion of a desired number. In any event, it will be desirable to provide a binding strip or suitable stitching 26 along the free edge of the material to prevent unraveling of the knit loops.

As will be understood, the fabric as it is knit will be stretched transversely to two or more times its normal contracted width and it will also be placed under a longitudinal tension. This enables the production of a fabric which is of reasonably close texture when stretched and is exceptionally close when drawn together under the contractive force of the elastic. Ordinarily it will be preferable to utilize both elastic and non-elastic threads in the knitting of the fabric. For example, the elastic and non-elastic threads may be alternately introduced or several courses of one type of thread may be alternated with one course of the other type, as desired, depending upon the contractive force to be produced in the completed garment.

While one illustrative form of garment embodying the invention has been disclosed in considerable detail, it will be understood that numerous changes may be made without departing from the general spirit and scope of the invention. For example, as previously stated, the fabric with integral stay-receiving pockets may be woven instead of knit, if desired. Furthermore, the material embodying these pockets and the stays may be employed at quite different points in a garment, as desired. This material may have one-way or two-way stretch. They may be placed at the sides or back in addition to or in lieu of the front. Certain portions of the garment may be formed of completely non-elastic material or of one-way elastic material, if desired. The section embodying the stays may be knit or woven with the same stitch throughout if desired, except for the formation of the welts wherever a stay is to be inserted. Other modifications will suggest themselves to persons skilled in the art.

What I claim is:

1. A garment of the class described comprising a body-encircling member having a portion formed of elastic material extending over the abdomen, a pocket integral with said material and extending substantially longitudinally of the garment, said pocket having elasticity and terminating at both ends some distance from the upper and lower edges of the elastic portion, the ends of said pocket being substantially closed by the interengagement of the threads forming the walls of the pocket, and stiffening means within said pocket.

2. In a garment of the class described, a member adapted to encircle the body of the wearer and confine the abdomen, said member having a portion thereof formed of material produced in part from elastic yarn and capable of stretching simultaneously both longitudinally and transversely of the wearer of the garment, said portion having the threads therein so arranged as to provide an integral, longitudinally extending pocket closed at both ends by the interengagement of the threads forming the walls of the pocket, and stiffening means enclosed in said pocket, said pocket being capable of stretching simultaneously in both directions in unison with the remainder of said portion and without interference by said stiffening means.

3. In a garment of the class described, a member adapted to encircle the body of the wearer and confine the abdomen, said member having a portion thereof formed of material knit in part from elastic yarn and capable of stretching simultaneously in two dimensions, said portion being primarily of rib knit formation but having a part in which the ribs have been omitted to provide an integral, longitudinally extending pocket of the width of a plurality of the ribs in the rib knit portion, said pocket being closed at both ends by resumption of the rib formation, and stiffening means enclosed in said pocket, said pocket being capable of stretching simultaneously in both directions in unison with the remainder of said portion and without interference by said stiffening means.

4. A method of producing an abdomen confining garment of the class described which comprises rib knitting a section of the garment in part of elastic thread, controlling the needles in the course of knitting to form a longitudinally extending welt having the width of a plurality of the ribs in the preceding rib knit section, inserting a stiffening element in the pocket so formed, and closing the end of the pocket by continuing the knitting of said section in rib formation without the welt.

5. In a garment of the class described, a member adapted to encircle the body of the wearer, said member having a portion thereof formed of material produced in part from elastic yarn, said portion having the threads therein so arranged as to provide an integral, longitudinally extending pocket substantially closed at both ends by the interengagement of the threads forming the walls of the pocket, and stiffening means enclosed in said pocket, said pocket being capable of stretching with the remainder of said portion and without interference by said stiffening means.

6. In a garment of the class described, a member adapted to encircle the body of the wearer and confine the abdomen, said member having a portion thereof formed of material knit in part from elastic yarn, said portion being primarily of rib knit formation but having a part in which the ribs have been omitted to provide an integral, longitudinally extending pocket of the width of a plurality of the ribs in the rib knit portion, said pocket being closed at both ends by resumption of the rib formation, and stiffening means enclosed in said pocket, said pocket being capable of stretching with the remainder of said portion and without interference by said stiffening means.

EMIL D. KATTERMANN.